B. B. GRUNWALD.
MOLDING DEVICE.
APPLICATION FILED APR. 20, 1920.
1,397,375.
Patented Nov. 15, 1921.
2 SHEETS—SHEET 2.
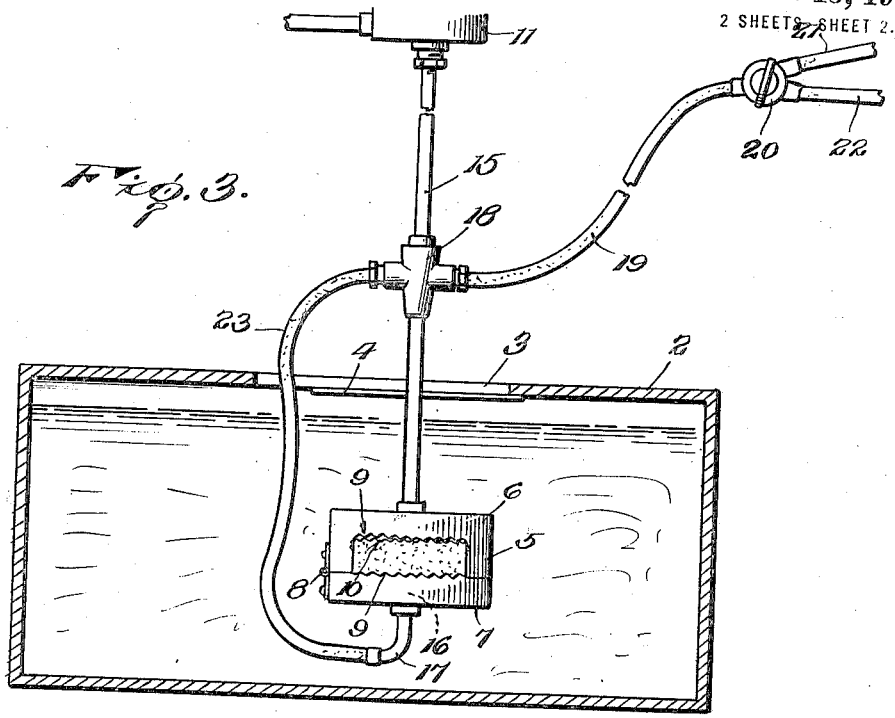
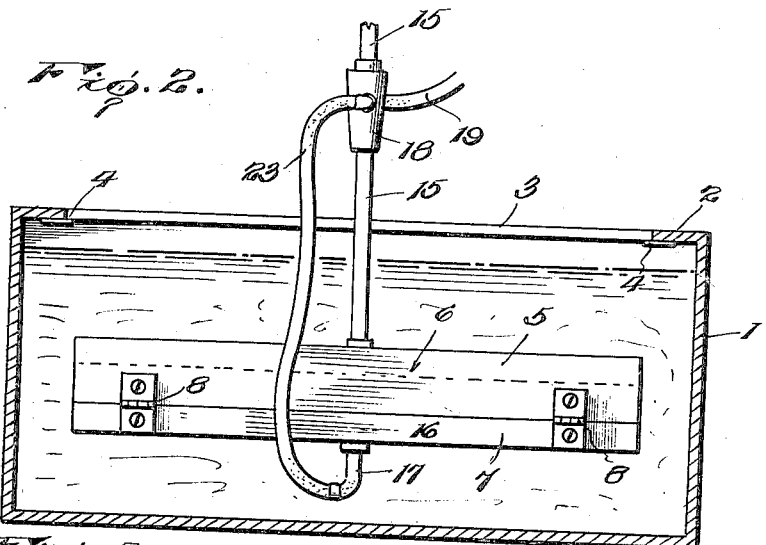
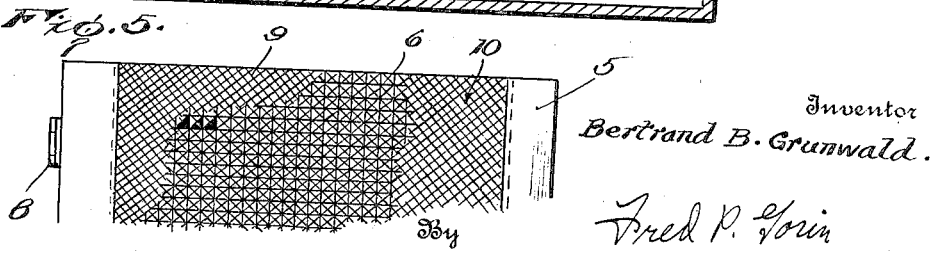
Inventor
Bertrand B. Grunwald.
By Fred P. Lorin
Attorney

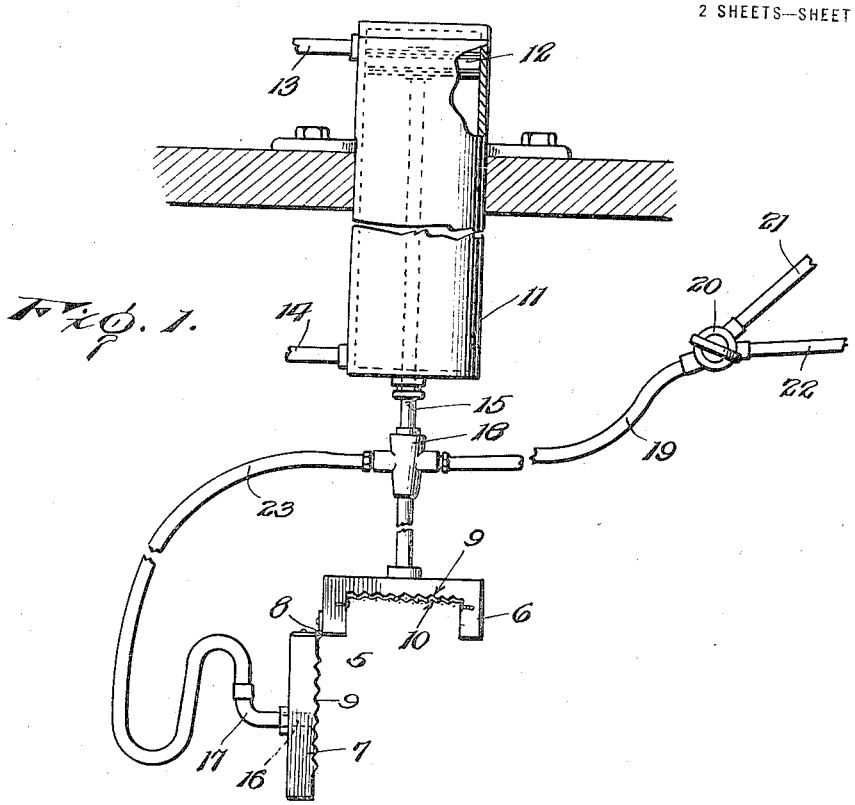
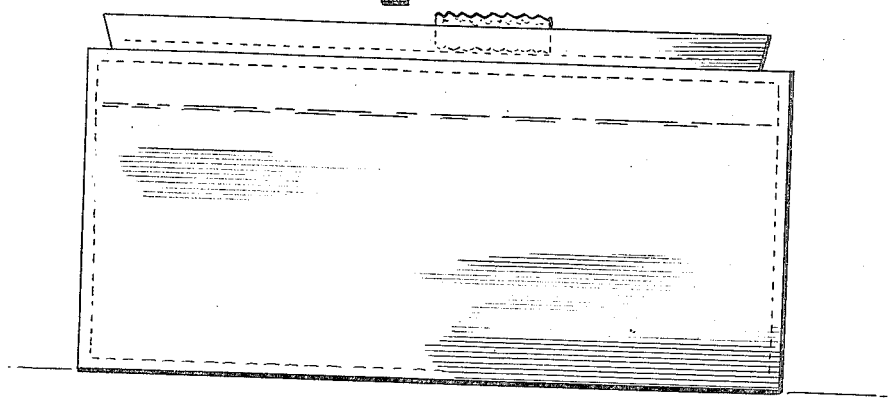
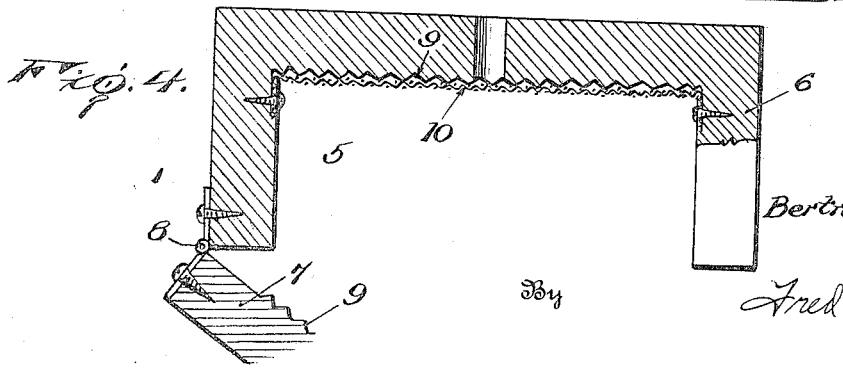

UNITED STATES PATENT OFFICE.

BERTRAND B. GRUNWALD, OF SEATTLE, WASHINGTON.

MOLDING DEVICE.

1,397,375.  Specification of Letters Patent.  Patented Nov. 15, 1921.

Application filed April 20, 1920. Serial No. 375,277.

*To all whom it may concern:*

Be it known that BERTRAND B. GRUNWALD, a citizen of Czechoslovakia, residing at Seattle, in the county of King and State of Washington, has invented certain new and useful Improvements in Molding Devices, of which the following is a specification.

This invention relates to an improvement in molding apparatus, and particularly to an apparatus for molding into sheet or block form material suitable for pipe and boiler coverings.

Material of this kind is ordinarily contained in a semi-liquid condition in a tank or vat, and the present invention is directed to means whereby a desirable quantity of such material is automatically molded into an appropriate shape, the ends of the molded section trimmed, and the molded sections automatically discharged following the molding operation.

In the drawings:—

Figure 1 is a view in side elevation, partly in section of the improved apparatus.

Fig. 2 is a similar view with the mold in initial or inoperative position.

Fig. 3 is an enlarged section through the vat, with the mold in molding position, the section being taken at right angles to that of Fig. 2.

Fig. 4 is an enlarged vertical section of the mold.

Fig. 5 is a plan of the bottom of the mold.

In the improved apparatus 1 represents a tank or vat, in which the material, usually in a semi-liquid condition is placed. The top 2 of this tank is formed with an opening 3 having a transverse dimension corresponding to that of the mold, and a longitudinal dimension somewhat exceeding the length of the mold. Cutting strips 4 are secured to the under side of the top 2, the operative edges of such strips being arranged to engage with the ends of the mold as the latter is withdrawn, to thereby trim the molded material, as will be evident.

The mold 5 is of any appropriate form being here shown as a rectangular upper section 6, and a plate like lower section 7 hinged at 8 to the upper section, to thereby complete a mold having opened ends. The inner surface of the top of the section 6, and the upper surface of the section 7 of the mold are formed with longitudinal extending corrugations 9, and screen material 10 is secured to the respective sections to overlie these corrugations.

The mold proper is connected with an operating device whereby such mold is lowered into and withdrawn from the vat. This operating device comprises a pressure cylinder 11 having a piston 12 adapted to be operated in either direction by fluid pressure through pipes 13 and 14. A pipe 15 depends from the piston 12 and is connected to the top of the upper mold section 6, said pipe 15 passing wholly through the top and communicating with the interior of the mold. The bottom mold section 7 has an opening 16 in which is secured a pipe section 17, the latter being in line with the pipe section 15 and also communicating with the interior of the mold. A two way connection 18 is arranged in the pipe 15, said pipe 15 below the connection being in communication therethrough with a pipe 19 leading to a two-way valve 20, having one port connected with a pressure pipe 21, and the other port connected with a suction pipe 22. A pipe 23 leads from the remaining port of the connection 18 to the pipes 17, this pipe 23 being preferably a flexible hose.

In operation the mold 5, in its opened relation as shown in Fig. 2 is lowered into the material in the vat, through the opening 3, by admitting fluid pressure above the piston 12. As the bottom section 7 of the mold enters the material in the vat, such section will be swung to closed position to complete the mold. The lowering of the mold is continued until it is below the surface of the material, whereupon the valve 20 is turned to connect the suction pipe 22 with the pipes 15 and 23. This draws the material fully and completely into the mold, such material being evenly distributed by the suction by reason of the corrugations 9 and screen 10. After the material has been held under suction for the desired length of time to properly fill the mold, the valve 20 is cut off, and fluid pressure is admitted below the piston 12 to raise the mold out of the vat. In this movement the blades 4 trim off the projecting material beyond the ends of the mold, so that said material in molded form is uniformly and evenly trimmed. After the mold has been raised from the vat the valve 20 is turned to cause the pressure pipe 21 to communicate with the mold, a screen or other support having been temporarily placed beneath the elevated mold. Under the pressure the mold is forced open and the molded article deposited on the screen or support.

Under the suction filling of the mold an even and uniformly accurate distribution of the material in the mold is secured, whereby the molded article has a uniform surface and is of substantially the same density throughout.

What I claim is:

1. A molding apparatus including a material vat, a mold, means for raising and lowering the mold with respect to the material in the vat, and means for evenly filling the mold when beneath the material, and means on the vat for trimming the material at the ends of the mold in the withdrawing movement of the mold.

2. A molding apparatus, including a material vat, a two-part mold with the parts hingedly connected means for lowering the mold into the vat and closing the mold by contact with the material, means for applying suction to the mold to draw the material evenly thereinto, means for raising the mold from the vat, means carried by the vat for trimming the material beyond the mold, and means for applying pressure to the material in the mold to open the mold for the discharge of the material.

3. A molding apparatus, including a material vat, a two-part mold with the parts hingedly connected, means for lowering the mold into the vat and closing the mold by contact with the material, means for applying suction at spaced points to the mold to draw the material evenly thereinto, means for raising the mold from the vat, means carried by the vat for trimming the material beyond the mold, and means for applying pressure to the material in the mold to open the mold for the discharge of the material.

4. A molding apparatus including a vat, a mold, a cylinder, a piston rod supporting the mold having a piston thereon reciprocable in the cylinder for raising and lowering the mold with respect to the material in the vat, means for evenly filling the mold when immersed in the material, and means on the vat for trimming the material at the ends of the mold in the withdrawing movement of the mold.

5. A molding apparatus including a vat, a mold, a piston reciprocable in a cylinder and connected with the mold for raising and lowering the mold with respect to the material in the vat, means for evenly filling the mold when immersed in the material, and cutting elements removably secured to the vat for trimming the material at the ends of the mold in the withdrawing movement of the mold.

6. A molding apparatus including a vat, a mold formed of hinged sections, a piston reciprocable in a cylinder, a hollow piston rod connecting the piston and one section of the mold for raising and lowering the mold with respect to the material, a two-way connection interposed in the piston rod, a hose connecting the other section of the mold with the two-way connection, and communicating with the interior of the mold, the hollow piston rod communicating with the interior of the mold and the two-way connection, a valve-controlled passage for admitting suction or pressure to the two-way connection, whereby the mold may be evenly filled with material when immersed therein, and cutting elements carried by the vat for trimming the material from the ends of the mold in the withdrawing movement of the mold.

In testimony whereof I affix my signature.

BERTRAND B. GRUNWALD.